(12) United States Patent
Roach

(10) Patent No.: US 9,211,942 B1
(45) Date of Patent: Dec. 15, 2015

(54) CONTROLLED BALLOON DESCENT USING STRAWS

(71) Applicant: Google Inc., Mountain View, CA (US)

(72) Inventor: Kevin Roach, Mountain View, CA (US)

(73) Assignee: Google Inc., Mountain View, CA (US)

( * ) Notice: Subject to any disclaimer, the term of this patent is extended or adjusted under 35 U.S.C. 154(b) by 267 days.

(21) Appl. No.: 13/932,887

(22) Filed: Jul. 1, 2013

(51) Int. Cl.
*B64B 1/62* (2006.01)

(52) U.S. Cl.
CPC ........................................ *B64B 1/62* (2013.01)

(58) Field of Classification Search
CPC ..... B64B 1/62; B64B 1/64; A63H 2027/1083
See application file for complete search history.

(56) References Cited

U.S. PATENT DOCUMENTS

| | | | | | |
|---|---|---|---|---|---|
| 1,577,756 | A | * | 3/1926 | Reagan | 244/97 |
| 1,857,963 | A | * | 5/1932 | Lehmann | 244/128 |
| 2,180,036 | A | * | 11/1939 | Dardel | 244/97 |
| 2,992,795 | A | * | 7/1961 | Fazio et al. | 244/31 |
| 3,216,466 | A | * | 11/1965 | Simko | 141/226 |
| 3,312,427 | A | * | 4/1967 | Yost | 244/31 |
| 3,614,031 | A | * | 10/1971 | Demboski | 244/32 |
| 4,651,956 | A | * | 3/1987 | Winker et al. | 244/99 |
| 5,967,459 | A | | 10/1999 | Hayashi | |
| 7,708,222 | B2 | * | 5/2010 | Lee | 244/30 |
| 8,061,648 | B2 | | 11/2011 | Lachenmeier | |
| 8,083,174 | B2 | * | 12/2011 | Lee | 244/30 |
| 8,485,465 | B2 | * | 7/2013 | Lee | 244/30 |
| 8,505,847 | B2 | * | 8/2013 | Ciampa et al. | 244/30 |
| 2008/0265086 | A1 | * | 10/2008 | Lee | 244/30 |
| 2008/0299990 | A1 | * | 12/2008 | Knoblach et al. | 455/456.1 |
| 2010/0264259 | A1 | * | 10/2010 | Lee | 244/33 |
| 2012/0091261 | A1 | * | 4/2012 | Lee | 244/33 |
| 2012/0138733 | A1 | | 6/2012 | Hiebl et al. | |
| 2012/0223181 | A1 | * | 9/2012 | Ciampa | 244/30 |

FOREIGN PATENT DOCUMENTS

| DE | 4023112 | 1/1992 |
|---|---|---|
| GB | 2473450 | 3/2011 |

* cited by examiner

*Primary Examiner* — Joseph W Sanderson
(74) *Attorney, Agent, or Firm* — McDonnell Boehnen Hulbert & Berghoff LLP (57) ABSTRACT

A balloon is provided having a balloon envelope, one or more straws, where each of the one or more straws includes a first end connected to the balloon envelope and a second end within the balloon envelop, one or more mechanisms, where each mechanism is operable to close and open the first end of one of the straws, and a control system configured to cause at least one of the mechanisms to close the first end of the corresponding straw such that gas is retained in the balloon envelope and to cause at least one of the mechanisms to open the first end of the corresponding straw such that gas below the second end of the corresponding straw is released from the balloon envelope through the corresponding straw, causing the balloon to descend.

22 Claims, 8 Drawing Sheets

CONTROLLED BALLOON DESCENT USING STRAWS

BACKGROUND

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

Disclosed herein are systems and methods for controlling the descent of a balloon. A balloon may contain one or more straws with one end connected to the balloon envelope and another end within the balloon envelope. One or more mechanisms may be operable to close and open the top ends of the straws. A control system may be configured to cause balloon descent by causing the mechanisms to open the top ends of one or more of the straws, allowing gas to escape from the envelope.

In one aspect, a balloon is provided having a balloon envelope, one or more straws, where each of the straws has a first end connected to the balloon envelope and a second end within the balloon envelope, one or more mechanisms, where each mechanism is operable to close and open the first end of one of the straws, and a control system configured to cause at least one of the mechanisms to close the first end of the corresponding straw such that gas is retained in the balloon envelope and to cause at least one of the mechanisms to open the first end of the corresponding straw such that gas below the second end of the corresponding straw is released from the balloon envelope through the corresponding straw, causing the balloon to descend.

In another aspect, a computer-implemented method is provided, including the steps of controlling the descent of a balloon, where the balloon includes a balloon envelope, one or more straws, where each of the one or more straws includes a first end connected to the balloon envelope and a second end within the balloon envelope, and one or more mechanisms, where each mechanism is operable to close and open the first end of one of the straws, and operating a control system to cause at least one of the mechanisms to close the first end of the corresponding straw such that gas is retained in the balloon envelope and to cause at least one of the mechanisms to open the first end of the corresponding straw such that gas below the second end of the corresponding straw is released from the balloon envelope through the corresponding, straw, causing the balloon to descend.

In another aspect, a non-transitory computer readable medium has stored therein instructions that are executable by a computing device to cause the computing device to perform functions including controlling the descent of a balloon, where the balloon includes a balloon envelope, one or more straws, where each of the one or more straws includes a first end connected to the balloon envelope and a second end within the balloon envelope, and one or more mechanisms, where each mechanism is operable to close and open the first end of one of the straws, and operating a control system to cause at least one of the mechanisms to close the first end of the corresponding straw such that gas is retained in the balloon envelope and to cause at least one of the mechanisms to open the first end of the corresponding straw such that gas below the second end of the corresponding straw is released from the balloon envelope through the corresponding straw, causing the balloon to descend.

In an additional aspect, example implementations may provide a system that includes means for controlling the descent of a balloon, where the balloon includes a balloon envelope, one or more straws, where each of the one or more straws includes a first end connected to the balloon envelope and a second end within the balloon envelope, and one or more mechanisms, where each mechanism is operable to close and open the first end of one of the straws, and means for operating a control system to cause at least one of the mechanisms to close the first end of the corresponding straw such that gas is retained in the balloon envelope and to cause at least one of the mechanisms to open the first end of the corresponding straw such that gas below the second end of the corresponding straw is released from the balloon envelope through the corresponding straw, causing the balloon to descend.

These as well as other aspects, advantages, and alternatives, will become apparent to those of ordinary skill in the art by reading the following detailed description, with reference where appropriate to the accompanying drawings.

DETAILED DESCRIPTION

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

1. Overview

Instruments and electronic equipment may be positioned within a payload of a balloon that may be kept aloft in the upper atmosphere. The instruments or electronic devices may be used to record various data and information. After a period of time, it may be desirable to have the payload return to the surface of the earth to retrieve the information obtained from the instruments and electronic devices positioned in the payload. There may be other, perhaps more important, reasons to bring the payload down to the earth's surface. For example, the balloon payload may be brought down to provide necessary upgrades to the electronic equipment within the payload. Or, the payload may be brought down to prevent the payload from entering into unauthorized air space. A balloon payload may be brought down or decommissioned for others reasons as well.

In order to bring the payload, or possibly the entire balloon, to the ground, the balloon envelope may be deflated or collapsed, or may be disconnected from the payload, to allow the payload to descend towards the earth. For example, the balloon envelope may be caused to rip, opening a hole in the envelope to deflate the balloon, and allowing the payload to return to the ground. However, in some cases, ripping the envelope may cause the balloon to come down too rapidly, potentially damaging valuable equipment. Additionally, ripping the envelope may not cause the balloon to deflate as expected. For example, the ripped portion may rotate to the bottom of the balloon, and enough lifting gas may remain in the balloon envelope to keep the payload aloft. In such instances, control of the balloon may be lost, resulting in the loss of the balloon payload. Furthermore, the payload may not return to the earth's surface at the desired time or location.

In some cases, an uncontrolled or drifting balloon may cause a nuisance or danger to air traffic. Moreover, when the balloon eventually returns to earth it may cause pollution as the balloon components are strewn across an eventual landing site. A perhaps more significant problem may arise if the payload is unable to be recovered from the uncontrolled balloon. Specifically, there could be an undesirable loss of expensive equipment within the payload, as well as the loss of important and potentially sensitive data stored in the balloon's payload.

Example embodiments may help to provide for safer recovery of a balloon's payload. In particular, an example balloon may be configured to return to the ground via release of a predictable amount of gas from the envelope. Further, an example balloon may be brought down with a partially collapsed envelope that remains attached to the payload, such that the envelope is not left to uncontrollably drift through the atmosphere and potentially cause the problems noted above. Further, an example balloon may be configured to control its descent rate when being brought down. Such controlled descent may help to prevent damage to the instruments and/or electronic devices upon impact with the ground, which in turn may help to protect the data and information that has been obtained and stored in the balloon and reduce the risk of injury to people or property beneath the payload.

In some embodiments, one or more straws may be inserted into a balloon envelope to allow for controlled release of gas from the envelope. Each of the straws may include a first end connected to or outside of the balloon envelope, and a second end within the balloon envelope. Further, each straw may include a mechanism that is operable to open and/or close the first end of the straw. Further, the balloon may have a control system configured to cause at least one of the mechanisms to close the first end of the corresponding straw so that gas is retained in the balloon envelope and to cause at least one of the mechanisms to open the first end of the corresponding straw so that gas below the second end of the corresponding straw is released from the balloon envelope through the corresponding straw, causing the balloon to descend.

The straws could have a wide range of embodiments suitable for allowing gas to escape from the balloon envelope. For example, the straws could be cylindrical in shape or they could have some different number of fixed sides. Different individual straws may have different shapes. Also, the openings on each end could be a number of different possible shapes and sizes. They could be circles with diameters of one inch, or two inches, or three inches, as an example. The straws may be made up of a number of possible different rigid or semi-rigid materials. For instance, the straws could be made from an extruded foam, an urethane foam, a polyurethane foam, or an expanded polypropylene foam.

In a further aspect, the amount by which a straw extends into the envelope and/or the size of a straw's opening may determine the total volume of gas that can be released via the straw. For example, there may be scenarios where it is desirable to release an amount of gas that corresponds to roughly half the height of the balloon envelope. In such a scenario, a straw with a length that is equal to roughly half the height of the balloon envelope may be opened. Furthermore, the size of the straw opening may affect the rate at which gas is released from the balloon, which in turn may also affect the total volume of gas released.

Further, the number of straws and the lengths of the straws may be varied according to desired goals. Only one straw may be used, or two, or three or more straws may be used. By utilizing multiple straws, a redundancy factor may also be achieved such that if one of the straws cannot be opened, a different straw may be used.

In a further aspect, utilizing multiple straws of different lengths may improve the amount of control over the descent rate of the balloon. For example, each straw could have a length roughly equal to a multiple of the shortest straw. Accordingly, an amount of gas corresponding to a certain section of the height of the balloon envelope could be released by opening the first end of each of the straws. As such, the straws could be opened sequentially to gradually increase the volume of gas that is released from the balloon, thus allowing for more granular control over the descent rate.

The mechanisms operable to open the first ends of the straws could also take on various forms. For example, a ball valve may located at the first end of each of the straws and the mechanism might include a swing arm or other component to remove the ball valve, thereby allowing gas to be released from the balloon envelope through the straw. Alternatively, the mechanism could involve the use of one or more movable plates located at the top ends of the straws that when moved, could allow for the release of gas through the straw. Additionally, a cord or tensioning line may be connected to each movable plate such that a plate is moved from the first end of a straw by cutting the cord. Other mechanisms for covering the first ends of each of the straws are also possible.

In additional embodiments, the control system may be configured to open the first end of one or more of the straws based on one or more factors, such as the altitude of the balloon or the rate of descent of the balloon. For example, a first straw may be opened in order to initiate descent of the balloon. It may then be determined at a later time that the descent rate of the balloon should be increased. For example, predictions about wind speed or other factors may have been incorrect so that the projected landing time and location is not as desired. Alternately, it may be desirable to increase the descent rate of the balloon at a certain time such as after the balloon has passed through the jet stream. It may then be desirable to open the first end of a shorter straw, thereby releasing additional gas from the balloon and increasing the rate of descent. The process can be repeated with additional shorter straws at later times in order to further increase the rate of descent of the balloon. In another embodiment, a parachute may be used to slow the rate of descent if it is determined that the rate of descent is faster than desired or expected.

2. Example Balloon Networks

Example embodiments help to provide a data network that includes a plurality of balloons; for example, a mesh network formed by high-altitude balloons deployed in the stratosphere. Since winds in the stratosphere may affect the locations of the balloons in a differential manner, each balloon in an example network may be configured to change its horizontal position by adjusting its vertical position (i.e., altitude). For instance, by adjusting its altitude, a balloon may be able find winds that will carry it horizontally (e.g., latitudinally and/or longitudinally) to a desired horizontal location.

Further, in an example balloon network, the balloons may communicate with one another using free-space optical communications. For instance, the balloons may be configured for optical communications using lasers and/or ultra-bright LEDs (which are also referred to as "high-power" or "high-output" LEDs). In addition, the balloons may communicate with ground-based station(s) using radio-frequency (RF) communications.

In some embodiments, a high-altitude-balloon network may be homogenous. That is, the balloons in a high-altitude-balloon network could be substantially similar to each other in one or more ways. More specifically, in a homogenous high-altitude-balloon network, each balloon is configured to communicate with one or more other balloons via free-space optical links. Further, some or all of the balloons in such a network, may additionally be configured to communicate with ground-based and/or satellite-based station(s) using RF and/or optical communications. Thus, in some embodiments, the balloons may be homogenous in so far as each balloon is configured for free-space optical communication with other balloons, but heterogeneous with regard to RF communications with ground-based stations.

In other embodiments, a high-altitude-balloon network may be heterogeneous, and thus may include two or more different types of balloons. For example, some balloons in a heterogeneous network may be configured as super-nodes, while other balloons may be configured as sub-nodes. It is also possible that some balloons in a heterogeneous network may be configured to function as both a super-node and a sub-node. Such balloons may function as either a super-node or a sub-node at a particular time, or, alternatively, act as both simultaneously depending on the context. For instance, an example balloon could aggregate search requests of a first type to transmit to a ground-based station. The example balloon could also send search requests of a second type to another balloon, which could act as a super-node in that context. Further, some balloons, which may be super-nodes in an example embodiment, can be configured to communicate via optical links with ground-based stations and/or satellites.

In an example configuration, the super-node balloons may be configured to communicate with nearby super-node balloons via free-space optical links. However, the sub-node balloons may not be configured for free-space optical communication, and may instead be configured for some other type of communication, such as RF communications. In that case, a super-node may be further configured to communicate with sub-nodes using RF communications. Thus, the sub-nodes may relay communications between the super-nodes and one or more ground-based stations using RF communications. In this way, the super-nodes may collectively function as backhaul for the balloon network, while the sub-nodes function to relay communications from the super-nodes to ground-based stations.

Figure 1:
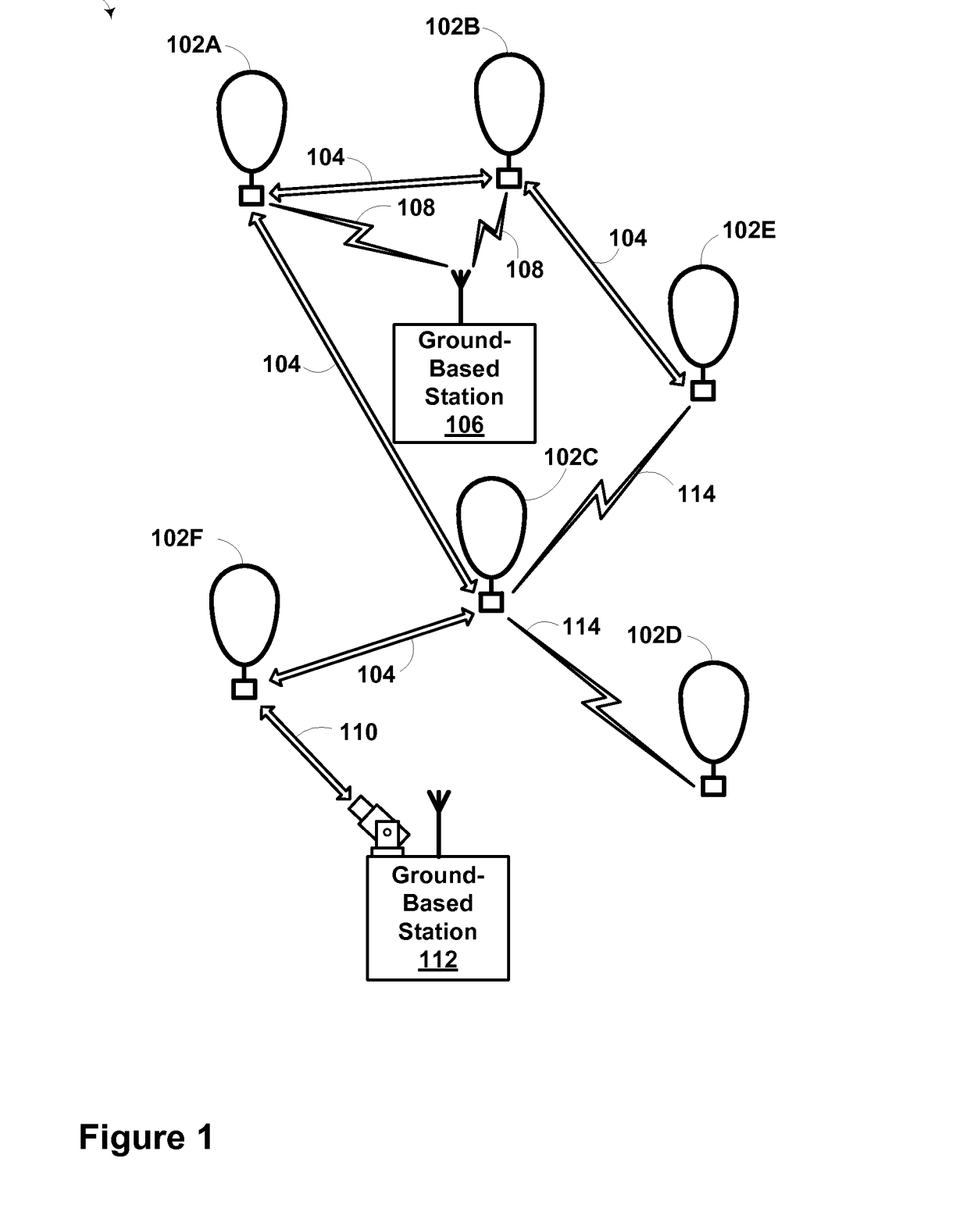
FIG. 1 is a simplified block diagram illustrating a balloon network, according to an example embodiment.

FIG. 1 is a simplified block diagram illustrating a balloon network 100, according to an example embodiment. As shown, balloon network 100 includes balloons 102A to 102F, which are configured to communicate with one another via free-space optical links 104. Balloons 102A to 102F could additionally or alternatively be configured to communicate with one another via RF links 114. Balloons 102A to 102F may collectively function as a mesh network for packet-data communications. Further, at least some of balloons 102A and 102B may be configured for RF communications with ground-based stations 106 and 112 via respective RF links 108. Further, some balloons, such as balloon 102F, could be configured to communicate via optical link 110 with ground-based station 112.

In an example embodiment, balloons 102A to 102F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an example embodiment, high-altitude balloons may be generally configured to operate in an altitude range within the stratosphere that has relatively low wind speed (e.g., between 5 and 20 miles per hour (mph)).

More specifically, in a high-altitude-balloon network, balloons 102A to 102F may generally be configured to operate at altitudes between 18 km and 25 km (although other altitudes are possible). This altitude range may be advantageous for several reasons. In particular, this layer of the stratosphere generally has relatively low wind speeds (e.g., winds between 5 and 20 mph) and relatively little turbulence. Further, while the winds between 18 km and 25 km may vary with latitude and by season, the variations can be modeled in a reasonably accurate manner. Additionally, altitudes above 18 km are typically above the maximum flight level designated for commercial air traffic. Therefore, interference with commercial flights is not a concern when balloons are deployed between 18 km and 25 km.

To transmit data to another balloon, a given balloon 102A to 102F may be configured to transmit an optical signal via an optical link 104. In an example embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, in order to receive an optical signal from another balloon via an optical link 104, a given balloon 102A to 102F may include one or more optical receivers. Additional details of example balloons are discussed in greater detail below, with reference to FIG. 3.

In a further aspect, balloons 102A to 102F may utilize one or more of various different RF air-interface protocols for communication with ground-based stations 106 and 112 via respective RF links 108. For instance, some or all of balloons 102A to 102F may be configured to communicate with ground-based stations 106 and 112 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-ground RF communication, among other possibilities.

In a further aspect, there may be scenarios where RF links 108 do not provide a desired link capacity for balloon-to-ground communications. For instance, increased capacity may be desirable to provide backhaul links from a ground-based gateway, and in other scenarios as well. Accordingly, an example network may also include downlink balloons, which could provide a high-capacity air-ground link.

For example, in balloon network 100, balloon 102F is configured as a downlink balloon. Like other balloons in an example network, a downlink balloon 102F may be operable for optical communication with other balloons via optical links 104. However, a downlink balloon 102F may also be configured for free-space optical communication with a ground-based station 112 via an optical link 110. Optical link 110 may therefore serve as a high-capacity link (as compared to an RF link 108) between the balloon network 100 and the ground-based station 112.

Note that in some implementations, a downlink balloon 102F may additionally be operable for RF communication with ground-based stations 106. In other cases, a downlink balloon 102F may only use an optical link for balloon-to-ground communications. Further, while the arrangement shown in FIG. 1 includes just one downlink balloon 102F, an example balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which may provide an RF link with substantially the same capacity as one of the optical links 104. Other forms are also possible.

Ground-based stations, such as ground-based stations 106 and/or 112, may take various forms. Generally, a ground-based station may include components such as transceivers, transmitters, and/or receivers for communication via RF links and/or optical links with a balloon network. Further, a ground-based station may use various air-interface protocols in order to communicate with a balloon 102A to 102F over an RF link 108. As such, ground-based stations 106 and 112 may be configured as an access point via which various devices can connect to balloon network 100. Ground-based stations 106 and 112 may have other configurations and/or serve other purposes without departing from the scope of the invention.

In a further aspect, some or all of balloons 102A to 102F could be configured to establish a communication link with space-based satellites in addition to, or as an alternative to, a ground-based communication link. In some embodiments, a balloon may communicate with a satellite via an optical link. However, other types of satellite communications are possible.

Further, some ground-based stations, such as ground-based stations 106 and 112, may be configured as gateways between balloon network 100 and one or more other networks. Such ground-based stations 106 and 112 may thus serve as an interface between the balloon network and the Internet, a cellular service provider's network, and/or other types of networks. Variations on this configuration and other configurations of ground-based stations 106 and 112 are also possible.

2a) Mesh Network Functionality

As noted, balloons 102A to 102F may collectively function as a mesh network. More specifically, since balloons 102A to 102F may communicate with one another using free-space optical links, the balloons may collectively function as a free-space optical mesh network.

2b) Station-Keeping Functionality

In an example embodiment, a balloon network 100 may implement station-keeping functions to help provide a desired network topology. For example, station-keeping may involve each balloon 102A to 102F maintaining and/or moving into a certain position relative to one or more other balloons in the network (and possibly in a certain position relative to the ground). As part of this process, each balloon 102A to 102F may implement station-keeping functions to determine its desired positioning within the desired topology, and if necessary, to determine how to move to the desired position.

The desired topology may vary depending upon the particular implementation. In some cases, balloons may implement station-keeping to provide a substantially uniform topology. In such cases, a given balloon 102A to 102F may implement station-keeping functions to position itself at substantially the same distance (or within a certain range of distances) from adjacent balloons in the balloon network 100.

In other cases, a balloon network 100 may have a non-uniform topology. For instance, example embodiments may involve topologies where balloons are distributed more or less densely in certain areas, for various reasons. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

In a further aspect, the topology of an example balloon network may be adaptable. In particular, station-keeping functionality of example balloons may allow the balloons to adjust their respective positioning in accordance with a change in the desired topology of the network. For example, one or more balloons could move to new positions to increase or decrease the density of balloons in a given area. Other examples are possible.

2c) Control of Balloons in a Balloon Network

Figure 2:
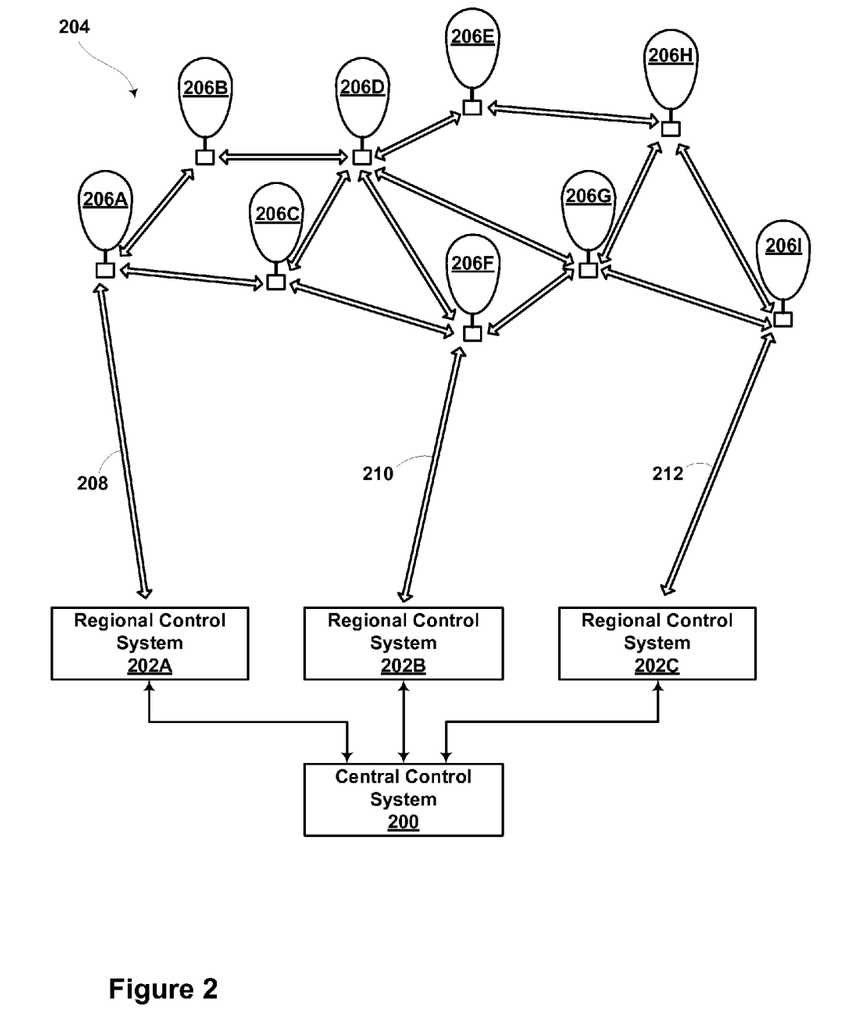
FIG. 2 is a block diagram illustrating a balloon-network control system, according to an example embodiment.

In some embodiments, mesh networking and/or station-keeping functions may be centralized. For example, FIG. 2 is a block diagram illustrating a balloon-network control system, according to an example embodiment. In particular, FIG. 2 shows a distributed control system, which includes a central control system 200 and a number of regional control-systems 202A to 202B. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via a number of regional control systems 202A to 202C.

These regional control systems 202A to 202C may be configured to receive communications and/or aggregate data from balloons in the respective geographic areas that they cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 206A, 206F, and 206I are configured as downlink balloons. As such, regional control systems 202A to 202C may respectively communicate with balloons 206A, 206F, and 206I via optical links 206, 208, and 210, respectively.

In the illustrated configuration, only some of balloons 206A to 206I are configured as downlink balloons. The balloons 206A, 206F, and 206I that are configured as downlink balloons may relay communications from central control system 200 to other balloons in the balloon network, such as balloons 206B to 206E, 206G, and 206H. However, it should be understood that in some implementations, it is possible that all balloons may function as downlink balloons. Further, while FIG. 2 shows multiple balloons configured as downlink balloons, it is also possible for a balloon network to include only one downlink balloon, or possibly even no downlink balloons.

Note that a regional control system 202A to 202C may in fact just be a particular type of ground-based station that is configured to communicate with downlink balloons (e.g., such as ground-based station 112 of FIG. 1). Thus, while not shown in FIG. 2, a control system may be implemented in conjunction with other types of ground-based stations (e.g., access points, gateways, etc.).

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all of the balloons 206A to 206I in order to determine an overall state of the network.

The overall state of the network may then be used to coordinate and/or facilitate certain mesh-networking functions such as determining lightpaths for connections. For example, the central control system 200 may determine a current topology based on the aggregate state information from some or all of the balloons 206A to 206I. The topology may provide a picture of the current optical links that are available in balloon network and/or the wavelength availability on the links. This topology may then be sent to some or all of the balloons so that a routing technique may be employed to select appropriate lightpaths (and possibly backup lightpaths) for communications through the balloon network 204.

FIG. 2 shows a distributed arrangement that provides centralized control, with regional control systems 202A to 202C coordinating communications between a central control system 200 and a balloon network 204. Such an arrangement may be useful to provide centralized control for a balloon network that covers a large geographic area. In some embodiments, a distributed arrangement may even support a global balloon network that provides coverage everywhere on earth. Of course, a distributed-control arrangement may be useful in other scenarios as well.

Further, it should be understood that other control-system arrangements are also possible. For instance, some implementations may involve a centralized control system with additional layers (e.g., sub-region systems within the regional control systems, and so on). Alternatively, control functions may be provided by a single, centralized, control system, which communicates directly with one or more downlink balloons.

In some embodiments, control and coordination of a balloon network may be shared by a ground-based control system and a balloon network to varying degrees, depending upon the implementation. In fact, in some embodiments, there may be no ground-based control systems. In such an embodiment, all network control and coordination functions may be implemented by the balloon network itself. For example, certain balloons may be configured to provide the same or similar functions as central control system 200 and/or regional control systems 202A to 202C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

Further, in some aspects, control of a balloon network may be partially or entirely localized, such that it is not dependent on the overall state of the network. For example, individual balloons may implement station-keeping functions that only consider nearby balloons. In particular, each balloon may implement an energy function that takes into account its own state and the states of nearby balloons. The energy function may be used to maintain and/or move to a desired position with respect to the nearby balloons, without necessarily considering the desired topology of the network as a whole. However, when each balloon implements such an energy function for station-keeping, the balloon network as a whole may maintain and/or move towards the desired topology.

Further, control systems such as those described above may determine when and/or where individual balloons should be taken down. Additionally, the control systems may navigate the balloons to locations where they are to be taken down. The control systems may also cause the balloons to be taken down, and may control their descent and/or otherwise facilitate their descent.

2d) Example Balloon Configuration

Figure 3:
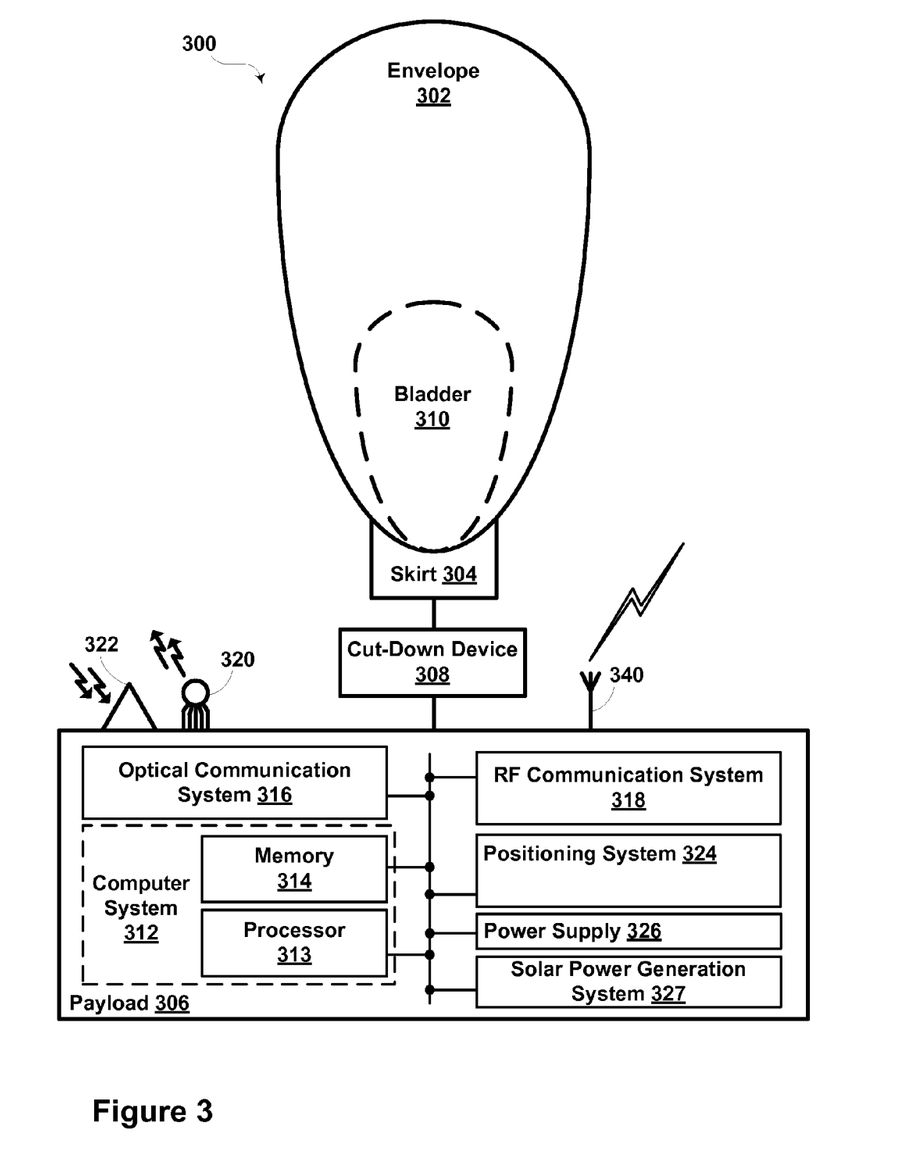
FIG. 3 is a simplified block diagram illustrating a high-altitude balloon, according to an example embodiment.

Various types of balloon systems may be incorporated in an example balloon network. As noted above, an example embodiment may utilize high-altitude balloons, which could typically operate in an altitude range between 18 km and 25 km. FIG. 3 shows a high-altitude balloon 300, according to an example embodiment. As shown, the balloon 300 includes an envelope 302, a skirt 304, a payload 306, and a cut-down system 308, which is attached between the balloon 302 and payload 304.

The envelope 302 and skirt 304 may take various forms, which may be currently well-known or yet to be developed. For instance, the envelope 302 and/or skirt 304 may be made of materials including metalized Mylar or BoPet. Additionally or alternatively, some or all of the envelope 302 and/or skirt 304 may be constructed from a highly-flexible latex material or a rubber material such as chloroprene. Other materials are also possible. Further, the shape and size of the envelope 302 and skirt 304 may vary depending upon the particular implementation. Additionally, the envelope 302 may be filled with various different types of gases, such as helium and/or hydrogen. Other types of gases are possible as well.

The payload 306 of balloon 300 may include a processor 312 and on-board data storage, such as memory 314. The memory 314 may take the form of or include a non-transitory computer-readable medium. The non-transitory computer-readable medium may have instructions stored thereon, which can be accessed and executed by the processor 312 in order to carry out the balloon functions described herein. Thus, processor 312, in conjunction with instructions stored in memory 314, and/or other components, may function as a controller of balloon 300.

The payload 306 of balloon 300 may also include various other types of equipment and systems to provide a number of different functions. For example, payload 306 may include an optical communication system 316, which may transmit optical signals via an ultra-bright LED system 320, and which may receive optical signals via an optical-communication receiver 322 (e.g., a photodiode receiver system). Further, payload 306 may include an RF communication system 318, which may transmit and/or receive RF communications via an antenna system 340.

The payload 306 may also include a power supply 326 to supply power to the various components of balloon 300. The power supply 326 could include a rechargeable battery. In other embodiments, the power supply 326 may additionally or alternatively represent other means known in the art for producing power. In addition, the balloon 300 may include a solar power generation system 327. The solar power generation system 327 may include solar panels and could be used to generate power that charges and/or is distributed by the power supply 326.

The payload 306 may additionally include a positioning system 324. The positioning system 324 could include, for example, a global positioning system (GPS), an inertial navigation system, and/or a star-tracking system. The positioning system 324 may additionally or alternatively include various motion sensors (e.g., accelerometers, magnetometers, gyroscopes, and/or compasses).

The positioning system 324 may additionally or alternatively include one or more video and/or still cameras, and/or various sensors for capturing environmental data.

Some or all of the components and systems within payload 306 may be implemented in a radiosonde or other probe, which may be operable to measure, e.g., pressure, altitude, geographical position (latitude and longitude), temperature, relative humidity, and/or wind speed and/or wind direction, among other information.

As noted, balloon 300 includes an ultra-bright LED system 320 for free-space optical communication with other balloons. As such, optical communication system 316 may be configured to transmit a free-space optical signal by modulating the ultra-bright LED system 320. The optical communication system 316 may be implemented with mechanical systems and/or with hardware, firmware, and/or software. Generally, the manner in which an optical communication system is implemented may vary, depending upon the particular application. The optical communication system 316 and other associated components are described in further detail below.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in the envelope 302.

In an example embodiment, a variable buoyancy system may include a bladder 310 that is located inside of envelope 302. The bladder 310 could be an elastic chamber configured to hold liquid and/or gas. Alternatively, the bladder 310 need not be inside the envelope 302. For instance, the bladder 310 could be a rigid bladder that could be pressurized well beyond neutral pressure. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow gas to escape from bladder 310. Multiple bladders 310 could be implemented within the scope of this disclosure. For instance, multiple bladders could be used to improve balloon stability.

In an example embodiment, the envelope 302 could be filled with helium, hydrogen or other lighter-than-air material. The envelope 302 could thus have an associated upward buoyancy force. In such an embodiment, air in the bladder 310 could be considered a ballast tank that may have an associated downward ballast force. In another example embodiment, the amount of air in the bladder 310 could be changed by pumping air (e.g., with an air compressor) into and out of the bladder 310. By adjusting the amount of air in the bladder 310, the ballast force may be controlled. In some embodiments, the ballast force may be used, in part, to counteract the buoyancy force and/or to provide altitude stability.

In other embodiments, the envelope 302 could be substantially rigid and include an enclosed volume. Air could be evacuated from envelope 302 while the enclosed volume is substantially maintained. In other words, at least a partial vacuum could be created and maintained within the enclosed volume. Thus, the envelope 302 and the enclosed volume could become lighter-than-air and provide a buoyancy force. In yet other embodiments, air or another material could be controllably introduced into the partial vacuum of the enclosed volume in an effort to adjust the overall buoyancy force and/or to provide altitude control.

In another embodiment, a portion of the envelope 302 could be a first color (e.g., black) and/or a first material from the rest of envelope 302, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 302 as well as the gas inside the envelope 302. In this way, the buoyancy force of the envelope 302 may increase. By rotating the balloon such that the second material is facing the sun, the temperature of gas inside the envelope 302 may decrease. Accordingly, the buoyancy force may decrease. In this manner, the buoyancy force of the balloon could be adjusted by changing the temperature/volume of gas inside the envelope 302 using solar energy. In such embodiments, it is possible that a bladder 310 may not be a necessary element of balloon 300. Thus, in various contemplated embodiments, altitude control of balloon 300 could be achieved, at least in part, by adjusting the rotation of the balloon with respect to the sun.

Further, a balloon 306 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location. Alternatively, the altitudinal adjustments may be computed by a ground-based or satellite-based control system and communicated to the high-altitude balloon. In other embodiments, specific balloons in a heterogeneous balloon network may be configured to compute altitudinal adjustments for other balloons and transmit the adjustment commands to those other balloons.

As shown, the balloon 300 also includes a cut-down system 308. The cut-down system 308 may be activated to separate the payload 306 from the rest of balloon 300. The cut-down system 308 could include at least a connector, such as a balloon cord, connecting the payload 306 to the envelope 302 and a means for severing the connector (e.g., a shearing mechanism or an explosive bolt). In an example embodiment, the balloon cord, which may be nylon, is wrapped with a nichrome wire. A current could be passed through the nichrome wire to heat it and melt the cord, cutting the payload 306 away from the envelope 302.

The cut-down functionality may be utilized anytime the payload needs to be accessed on the ground, such as when it is time to remove balloon 300 from a balloon network, when maintenance is due on systems within payload 306, and/or when power supply 326 needs to be recharged or replaced.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it does not need to be accessed on the ground. In yet other embodiments, in-flight balloons may be serviced by specific service balloons or another type of service aerostat or service aircraft.

3. Balloon Network with Optical and RF Links Between Balloons

In some embodiments, a high-altitude-balloon network may include super-node balloons, which communicate with one another via optical links, as well as sub-node balloons, which communicate with super-node balloons via RF links. Generally, the optical links between super-node balloons may be configured to have more bandwidth than the RF links between super-node and sub-node balloons. As such, the super-node balloons may function as the backbone of the balloon network, while the sub-nodes may provide sub-networks providing access to the balloon network and/or connecting the balloon network to other networks.

Figure 4:
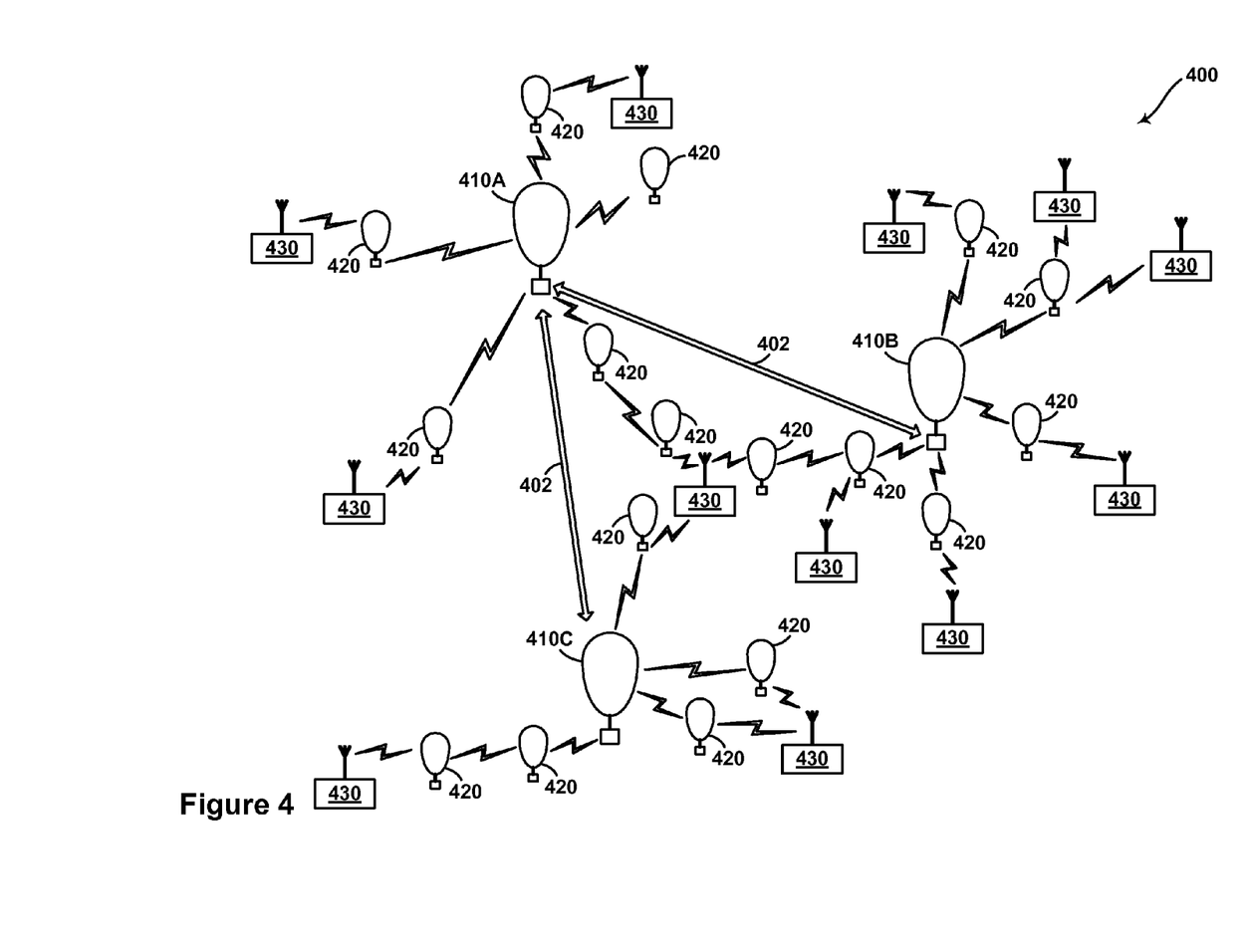
FIG. 4 shows a balloon network that includes super-nodes and sub-nodes, according to an example embodiment.

FIG. 4 is a simplified block diagram illustrating a balloon network that includes super-nodes and sub-nodes, according to an example embodiment. More specifically, FIG. 4 illustrates a portion of a balloon network 400 that includes super-node balloons 410A to 410C (which may also be referred to as "super-nodes") and sub-node balloons 420 (which may also be referred to as "sub-nodes").

Each super-node balloon 410A to 410C may include a free-space optical communication system that is operable for packet-data communication with other super-node balloons. As such, super-nodes may communicate with one another over optical links. For example, in the illustrated embodiment, super-node 410A and super-node 401B may communicate with one another over optical link 402, and super-node 410A and super-node 401C may communicate with one another over optical link 404.

Each of the sub-node balloons 420 may include a radio-frequency (RF) communication system that is operable for packet-data communication over one or more RF air interfaces. Accordingly, each super-node balloon 410A to 410C may include an RF communication system that is operable to route packet data to one or more nearby sub-node balloons 420. When a sub-node 420 receives packet data from a super-node 410, the sub-node 420 may use its RF communication system to route the packet data to a ground-based station 430 via an RF air interface.

As noted above, the super-nodes 410A to 410C may be configured for both longer-range optical communication with other super-nodes and shorter-range RF communications with nearby sub-nodes 420. For example, super-nodes 410A to 410C may use using high-power or ultra-bright LEDs to transmit optical signals over optical links 402, 404, which may extend for as much as 100 miles, or possibly more. Configured as such, the super-nodes 410A to 410C may be capable of optical communications at data rates of 10 to 50 GBit/sec or more.

A larger number of high-altitude balloons may then be configured as sub-nodes, which may communicate with ground-based Internet nodes at data rates on the order of approximately 10 Mbit/sec. For instance, in the illustrated implementation, the sub-nodes 420 may be configured to connect the super-nodes 410 to other networks and/or directly to client devices.

Note that the data speeds and link distances described in the above example and elsewhere herein are provided for illustrative purposes and should not be considered limiting; other data speeds and link distances are possible.

In some embodiments, the super-nodes 410A to 410C may function as a core network, while the sub-nodes 420 function as one or more access networks to the core network. In such an embodiment, some or all of the sub-nodes 420 may also function as gateways to the balloon network 400. Additionally or alternatively, some or all of ground-based stations 430 may function as gateways to the balloon network 400.

4. Providing a Balloon Envelope, One or More Straws Connected to the Envelope and Opening within the Envelope, and Mechanisms to Open the Straws so that Gas Below the Straws May be Released, Causing Balloon Descent.

As noted above, instruments or electronic devices may be positioned within a payload attached to a high atmosphere balloon. The instruments or electronic devices may be used to record various data and information. After a period of time, it may be desirable to have the payload return to the surface of the earth to retrieve the information obtained from the instruments and electronic devices positioned in the payload.

The balloon envelope may be deflated or collapsed, or disconnected from the payload, to allow the payload to descend to the surface of the earth. For example, the balloon envelope may be caused to rip, opening a hole in the envelope to deflate the balloon; or if a cord is used to attach the payload to the balloon envelope, the cord may be severed, using for example mechanical or electromagnetic cut-down devices. Once the balloon is deflated, or the payload is severed from the balloon envelope, the payload is allowed to descend to the earth. However, ripping the envelope or severing the payload from the envelope may cause too much lifting gas to escape from the balloon, leading to an uncontrolled, rapid descent of the payload. Additionally, ripping the envelope may not be sufficiently effective to cause the balloon to deflate as the ripped portion may rotate to the bottom of the balloon, and enough lift gas may remain in the balloon envelope to keep the payload aloft.

In instances where the balloon envelope is not sufficiently deflated, or is severed from the payload, an uncontrolled or drifting balloon envelope may exist that could cause a nuisance or danger to air traffic, cause pollution, or result in the loss of the payload and the equipment and instruments within the payload.

It may be desirable to provide a balloon equipped with means to ensure that, when it is desired to have the balloon payload return to the earth's surface, a particular amount of gas may be released from the balloon envelope to allow the payload to return to the earth's surface at a desired time and location. It may also be desirable to provide a balloon where the collapsed balloon envelope remains with the payload when the payload returns to earth so that the balloon envelope is not left to uncontrollably drift through the atmosphere and cause the problems noted above. It may also be desirable to control the rate of descent of the payload to the earth so that the instruments or electronic devices are not damaged upon impact, and so that the data and information that has been obtained may be retrieved, as well as to reduce the risk of injury to people or property beneath the payload.

As shown in FIGS. 5-8, example embodiments may be directed to a balloon having a balloon envelope 20, a payload 30 positioned beneath the balloon envelope 20, one or more straws 40, 60, 80 having a first end connected to the balloon envelope 20 and a second end within the balloon envelope 20, and one or more mechanisms 50, 70, 90 operable to close and open the first end of one or more of the straws 40, 60, 80. A control system may cause one or more of the mechanisms 50, 70, 90 to open the first end of one or more of the straws 40, 60, 80 allowing the gas below the second end of the one or more open straws 40, 60, 80 to escape from the balloon envelope 20, causing balloon descent.

Figure 5A:
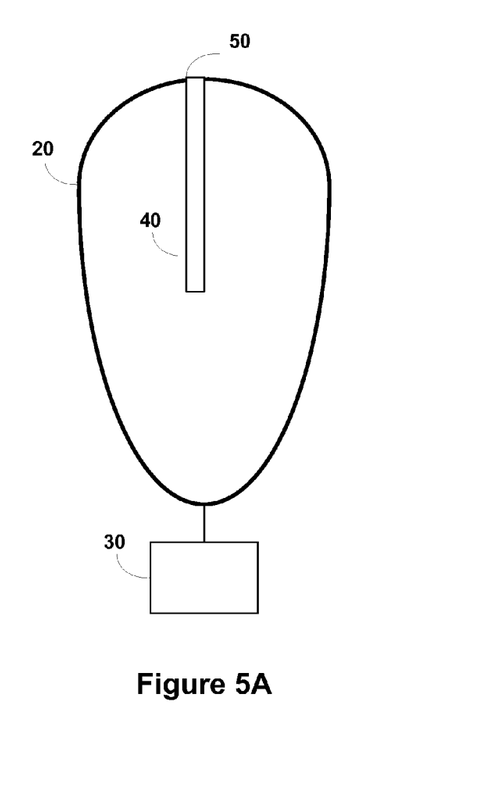
FIG. 5A shows an expanded balloon containing one straw, according to an example embodiment.
Figure 5B:
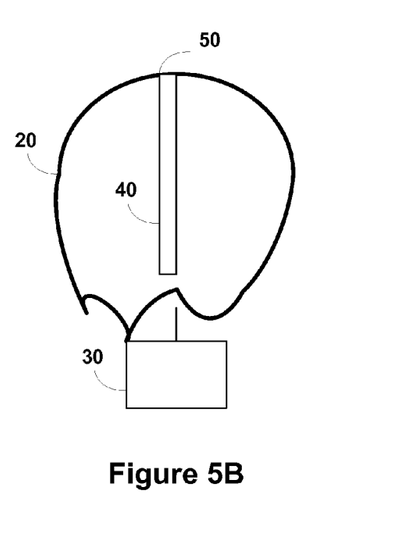
FIG. 5B shows the balloon of FIG. 5A, where the first end of the straw has been opened, allowing gas below the straw to be released from the balloon, according to an example embodiment.

One example embodiment may be directed to a balloon having a single straw to allow for a certain amount of gas, but not all of the gas, to be released from the balloon envelope in order to control the descent of the payload. As shown in FIGS. 5A and 5B, a straw 40 may be attached to the balloon envelope 20, along with a mechanism 50 located at the top end of the straw 40. The mechanism 50 may be operable to close and open the top end of the straw 40. A control system may cause the mechanism 50 to open the top end of the straw 40 allowing gas to escape from the balloon envelope 20 through the straw 40. Because the balloon envelope 20 remains with the payload 30, the problems noted above with an uncontrolled, drifting balloon envelope are avoided.

FIG. 5B shows balloon envelope 20 after the mechanism 50 has opened the top end of the straw 40. As can be seen, the gas below the straw 40 may escape through the straw 40, causing the balloon 20 to partially deflate. By varying the length of the straw 40, the amount of gas that is released from the balloon envelope 20 upon opening the top end of the straw 40 may be varied. If enough lift gas is released from the balloon envelope, the balloon will descend. In one example embodiment, the length of the straw 40 may be approximately equal to half the height of the balloon envelope 20. Accordingly, when the top end of the straw 40 is opened by the mechanism 50, an amount of gas that corresponds to roughly half the height of the balloon envelope 20 may be released through the straw 40. Other lengths of the straw 40 are also possible.

In some aspects, the size of a straw's opening may also be chosen so that a desired volume of gas is released when the straw is opened. For a given opening size, an outgassing rate may be determined based on the external pressure outside the envelope. Accordingly, the amount of gas remaining in the envelope at any given time after the straw was opened may be determined. Gas may continue to be released until the volume of gas remaining does not extend below the bottom of the straw. This volume may depend on the temperature and pressure of the surrounding air, which vary as the balloon descends. In some embodiments, predicting the total volume of gas that may be released through a straw may be simplified by using a large enough straw opening so that it may be assumed that most of the lift gas will be released at the same altitude that the straw was opened.

Figure 6A:
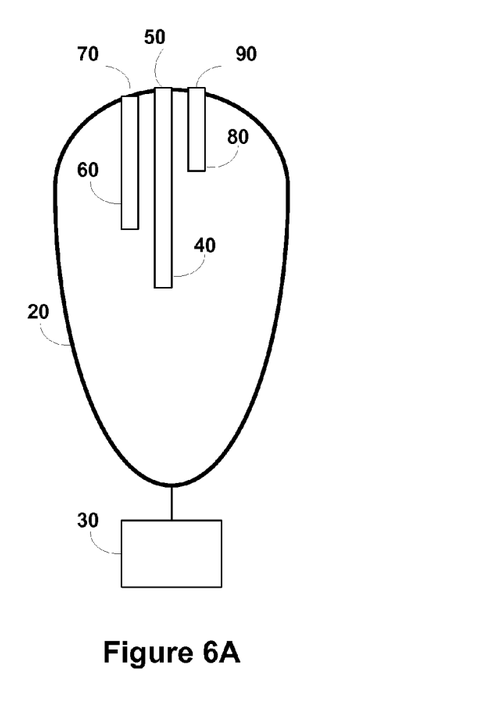
FIG. 6A shows an expanded balloon containing three straws of different lengths, according to an example embodiment.
Figure 6B:
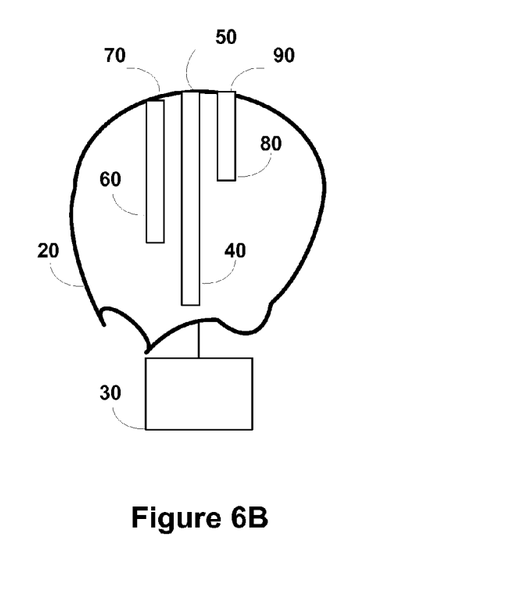
FIG. 6B shows the balloon of FIG. 6A, where the first end of the longest straw has been opened, allowing gas below the longest straw to be released from the balloon, according to an example embodiment.

In another example embodiment, three straws of different lengths may be used so that different volumes of gas may be released from the balloon envelope. As shown in FIG. 6A, three straws 40, 60, 80 may be connected to the balloon envelope 20 along with mechanisms 50, 70, 90 operable to close and open the three straws. FIG. 6A shows a fully inflated balloon envelope 20. In order to initiate descent of the balloon, a control system may cause one of the mechanisms 50, 70, 90 to open one of the straws 40, 60, 80 to release gas from the balloon envelope. A straw with a particular length may be chosen to open based on the desired rate of descent. By selecting a shorter straw, more gas will be released, causing a faster rate of descent. As an example, the control system may cause the mechanism 50 corresponding to the longest straw 40 to open the top end of the longest straw 40. FIG. 6B shows a partially deflated balloon envelope 20 resulting after the top end of the longest straw 40 has been opened. If enough lift gas is released from the balloon envelope, the balloon will begin to descend.

In another example embodiment, the control system may be configured to cause the mechanisms 50, 70, 90 to open the top ends of the straws 40, 60, 80 based on one or more factors, such as the current altitude of the balloon or the current rate of descent of the balloon. A projected landing time and location may be determined for an amount of gas released corresponding to each straw based on estimates of wind speeds and other factors that may affect the path of balloon descent. The control system may then choose which straw to open based on the desired landing time and location.

Figure 6C:
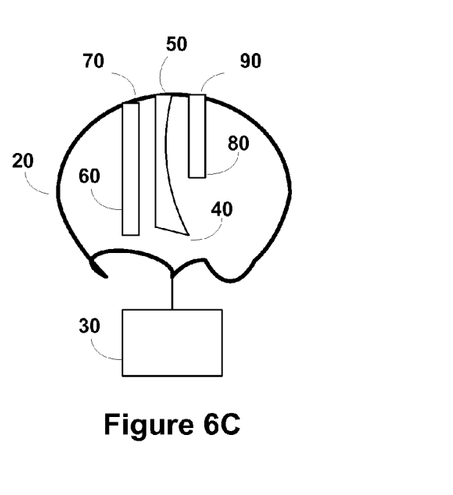
FIG. 6C shows the balloon of FIG. 6A, where the first end of the second longest straw has been opened, allowing gas below the second longest straw to be released from the balloon, according to an example embodiment.
Figure 6D:
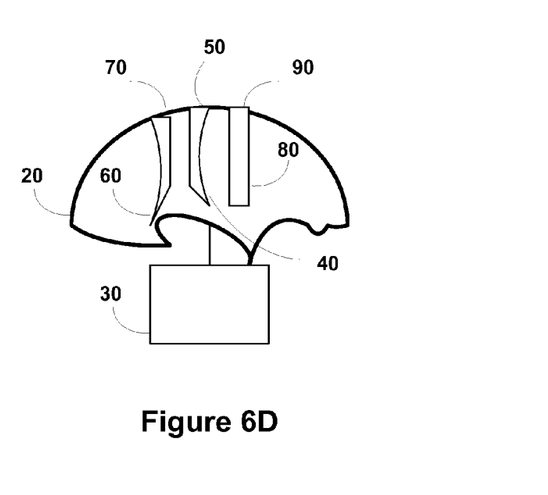
FIG. 6D shows the balloon of FIG. 6A, where the first end of the shortest straw has been opened, allowing gas below the shortest straw to be released from the balloon, according to an example embodiment.

In an additional embodiment, the control system may open one straw at a first time and one or more additional straws at later times. For example, after one straw is opened, it may later be determined that the balloon is not on course to land at the projected time and location because predictions about wind speeds or other factors were inaccurate. Accordingly, it may be desirable to open the top end of a shorter straw. Opening a shorter straw will cause additional gas to escape from the balloon envelope, which will increase the rate of balloon descent. For example, a shorter straw 60 may be opened in order to release additional lift gas from the balloon envelope 20. FIG. 6C shows a further deflated balloon envelope 20 resulting after the top end of the second longest straw 60 has been opened by the corresponding mechanism 70. It may later be desirable to release even more gas from the balloon envelope 20 to again increase the rate of descent of the balloon. Accordingly, FIG. 6D shows a further deflated balloon envelope 20 resulting after the top end of the shortest straw 80 has been opened by the corresponding mechanism 90.

It may also be desirable to incorporate a component to decrease the rate of descent of the balloon. Example embodiments may be directed to a balloon that also contains a parachute attached to the balloon that may serve to slow the descent of the balloon after the balloon envelope has been partially or completely deflated. The parachute may be attached to the top of the balloon envelope, for example. Alternatively, the parachute may be attached to a different location on the balloon envelope, or to the payload. Upon opening, the parachute may create additional drag force, thereby slowing the descent of the balloon towards the earth.

Figure 7:
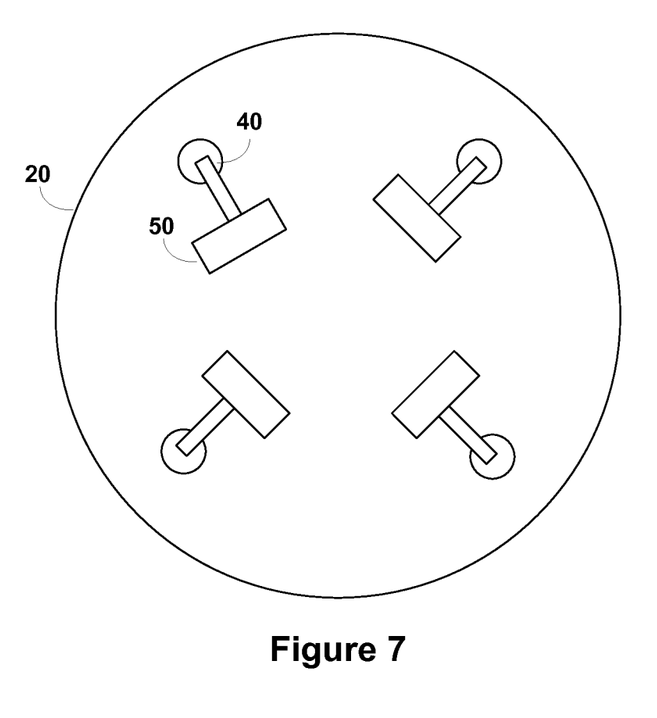
FIG. 7 shows a top view of a balloon with mechanisms operable to close and open the first ends of several straws, according to an example embodiment.

One or more mechanisms may be operable to close open the top ends of the straws in order to allow gas to escape from the balloon envelope. FIG. 7 shows a top view of a balloon with mechanisms 50 operable to close and open the first ends of several straws 40, according to an example embodiment. In this example, four straws and four mechanisms are shown attached to the balloon envelope 20, but other combinations are also possible. The mechanism 50 may take the form of a ball valve and swing arm that initially is configured to close the top end of the straw 40. Later, a control system may cause the mechanism 50 to remove the ball valve, opening the top end of the straw 40 and allowing lift gas to escape from the balloon envelop 20. In an alternate embodiment, the mechanism 50 may take the form of a movable plate that initially covers the top end of the straw 40. The movable plate may later be removed, perhaps by cutting a cord attached to the plate or by other means, in order to open the top end of the straw 40 to allow gas to escape from the balloon envelope 20. Other embodiments involving different types of mechanisms that initially cover the top end of one or more of the straws and later uncover the corresponding straws are also possible.

Figure 8A:
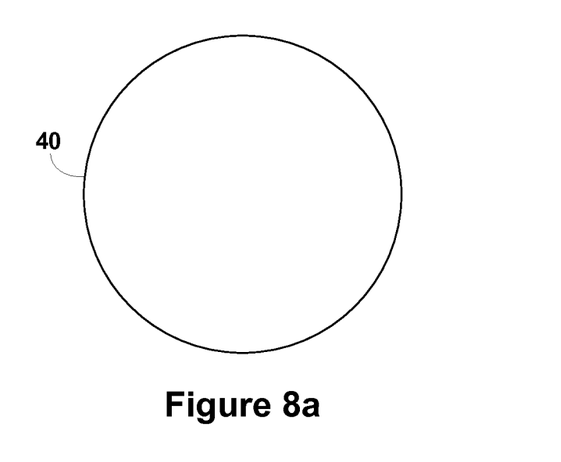
FIG. 8A shows a top view of a straw as shown in FIGS. 5-7, according to an example embodiment.
Figure 8B:
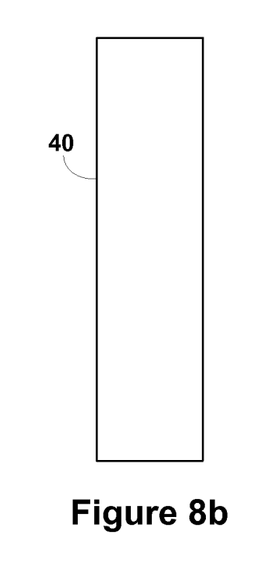
FIG. 8B shows a side view of a straw as shown in FIGS. 5-7, according to an example embodiment.

One or more straws may be included, having a first end connected to the balloon envelope and a second end opening within the balloon envelope. FIGS. 8A and 8B show top and side views of an example embodiment of a straw 40. As can be seen in FIG. 8A, the straw may be circular when viewed from the top. The diameter of the circle may be one inch, two inches, three inches, or some other size. Other constructions are also possible. For example, the shape of the straw may be oval, square, rectangular, triangular, or take on any number of other possible forms when viewed from the top. FIG. 8B shows a side view of an example straw 40. Other constructions are also possible. For example, the straw may be angled, the diameter of the straw may be increasing or decreasing, or it may take on more complex geometries. Additionally, each individual straw may have a different shape.

Figure 9:
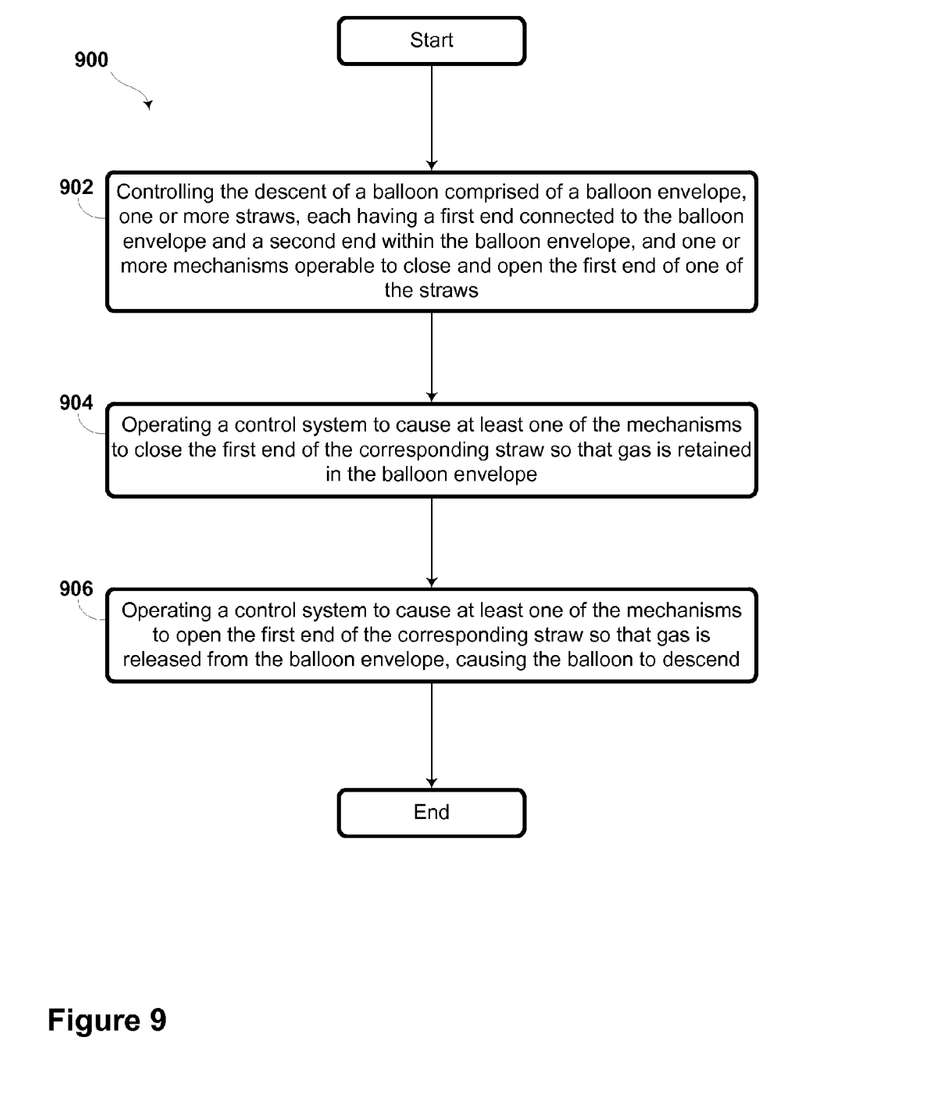
FIG. 9 is a method, according to an example embodiment.

FIG. 9 shows a method 900 that is provided that may include the step 902 of controlling the descent of a balloon comprised of a balloon envelope, one or more straws, each having a first end connected to the balloon envelope and a second end within the balloon envelope, and one or mechanisms operable to close and open the first end of one of the straws. The method 900 may further include the step 904 of operating a control system to cause at least one of the mechanisms to close the first end of the corresponding straw so that gas is retained in the balloon envelope. In addition, the method 900 may further include the step 906 of operating a control system to cause at least one of the mechanisms to open the first end of the corresponding straw so that gas is released from the balloon envelope, causing the balloon to descend.

5. A Non-Transitory Computer Readable Medium with Instructions to Control the Descent of a Balloon Having a Balloon Envelope, One or More Straws, and One or Mechanisms Operable to Close and Open the First End of One of the Straws, and to Operate a Control System to Cause the Mechanisms to Close and Open the Straws, Causing Balloon Descent.

Some or all of the functions described above and illustrated in FIGS. 5-8 may be performed by a computing device in response to the execution of instructions stored in a non-transitory computer readable medium. The non-transitory computer readable medium could be, for example, a random access memory (RAM), a read-only memory (ROM), a flash memory, a cache memory, one or more magnetically encoded discs, one or more optically encoded discs, or any other form of non-transitory data storage. The non-transitory computer readable medium could also be distributed among multiple data storage elements, which could be remotely located from each other. The computing device that executes the stored instructions could be a computing device, such as the processor 312 illustrated in FIG. 3. Alternatively, the computing device that executes the stored instructions could be another computing device, such as a server in a server network, or a ground-based station.

The non-transitory computer readable medium may store instructions executable by the processor 312 to perform various functions. The functions could include controlling the descent of a balloon, where the balloon includes a balloon envelope, one or more straws, where each of the one or more straws includes a first end connected to the balloon envelope and second end within the balloon envelope, and one or more mechanisms, where each mechanism is operable to close and open the first end of one of the straws, and operating a control system to cause at least one of the mechanisms to close the first end of the corresponding straw such that gas is retained in the balloon envelope and to cause at least one of mechanisms to open the first end of the corresponding straw such that gas below the second end of the corresponding straw is released from the balloon envelope through the corresponding straw, causing the balloon to descend.

CONCLUSION

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:
1. A balloon comprising:
a balloon envelope;
a plurality of straws, wherein each of the straws comprises a first end connected to the balloon envelope and a second end within the balloon envelope;

a plurality of mechanisms, wherein each mechanism is operable to close and open the first end of a corresponding one of the straws; and a control system configured to:

cause the plurality of the mechanisms to close the first end of each of the straws such that gas is retained in the balloon envelope;

cause a first mechanism of the plurality of mechanisms to open the first end of a first corresponding straw at a first time such that gas below the second end of the first corresponding straw is released from the balloon envelope through the first corresponding straw, causing the balloon to descend; and cause a second mechanism of the plurality of mechanisms to open the first end of a second corresponding straw at a later second time such that gas below the second end of the second corresponding straw is released from the balloon envelope through the second corresponding straw, causing the balloon to descend.

2. The balloon of claim 1, wherein each of the plurality of straws has a different length.

3. The balloon of claim 1, wherein at least one of the straws has a length that is approximately equal to half of a maximum height of the balloon envelope.

4. The balloon of claim 1, wherein the plurality of straws comprises:

a shortest straw having a given length; and one or more other straws, wherein each of the one or more other straws has a length that is approximately equal to a multiple of the given length of the shortest straw.

5. The balloon of claim 1, wherein the plurality of straws comprises three straws.

6. The balloon of claim 1, wherein each of the plurality of straws comprises an extruded foam straw.

7. The balloon of claim 1, wherein each of the plurality of straws comprises a polyurethane foam straw.

8. The balloon of claim 1, wherein each mechanism comprises a ball valve, wherein the ball valve is located at the first end of the corresponding straw.

9. The balloon of claim 1, wherein each mechanism comprises a movable plate, wherein the movable plate is located at the first end of the corresponding straw.

10. The balloon of claim 9, wherein each mechanism further comprises a cord connected to the movable plate such that the first end of the corresponding straw is opened by cutting the cord.

11. The balloon of claim 1, wherein the control system is configured to open the first end of one or more of the straws based on at least the altitude of the balloon.

12. The balloon of claim 1, wherein the control system is configured to open the first end of one or more of the straws based on at least the rate of the descent of the balloon.

13. The balloon of claim 1, further comprising a parachute attached to the balloon, wherein the parachute serves to slow the descent of the balloon.

14. A computer-implemented method comprising:

controlling the descent of a balloon, wherein the balloon is comprised of a balloon envelope, a plurality of straws, wherein each of the straws comprises a first end connected to the balloon envelope and a second end within the balloon envelope, and a plurality of mechanisms, wherein each mechanism is operable to close and open the first end of a corresponding one of the straws; and operating a control system to:

cause the plurality of the mechanisms to close the first end of each of the straws such that gas is retained in the balloon envelope;

cause a first mechanism of the plurality of mechanisms to open the first end of a corresponding straw at a first time such that gas below the second end of the first corresponding straw is released from the balloon envelope through the first corresponding straw, causing the balloon to descend; and cause a second mechanism of the plurality of mechanisms to open the first end of a second corresponding straw at a later second time such that gas below the second end of the second corresponding straw is released from the balloon envelope through the second corresponding straw, causing the balloon to descend.

15. The method of claim 14, wherein each of the plurality of straws has a different length.

16. The method of claim 14, wherein the plurality of straws comprises three straws.

17. The method of claim 14, wherein controlling the descent of a balloon further comprises using a parachute attached to the balloon to slow the descent of the balloon.

18. A non-transitory computer readable medium having stored therein instructions executable by a computing device to cause the computing device to perform functions comprising:

controlling the descent of a balloon, wherein the balloon is comprised of a balloon envelope, a plurality of straws, wherein each of the straws comprises a first end connected to the balloon envelope and a second end within the balloon envelope, and a plurality of mechanisms, wherein each mechanism is operable to close and open the first end of a corresponding one of the straws; and operating a control system to:

cause the plurality of the mechanisms to close the first end of each of the straws such that gas is retained in the balloon envelope;

cause a first mechanism of the plurality of mechanisms to open the first end of a corresponding straw at a first time such that gas below the second end of the first corresponding straw is released from the balloon envelope through the first corresponding straw, causing the balloon to descend; and cause a second mechanism of the plurality of mechanisms to open the first end of a second corresponding straw at a later second time such that gas below the second end of the second corresponding straw is released from the balloon envelope through the second corresponding straw, causing the balloon to descend.

19. The non-transitory computer readable medium of claim 18, wherein each of the plurality of straws has a different length.

20. The non-transitory computer readable medium of claim 18, wherein the plurality of straws comprises three straws.

21. The non-transitory computer readable medium of claim 18, wherein controlling the descent of a balloon further comprises using a parachute attached to the balloon to slow the descent of the balloon.

22. A balloon comprising:

a balloon envelope;

one or more straws, wherein each of the one or more straws comprises a first end connected to the balloon envelope and a second end within the balloon envelope;

one or more mechanisms corresponding to the one or more straws, wherein each mechanism comprises:

a movable plate, wherein the movable plate is positioned at the first end of a corresponding one of the straws to keep the first end of the corresponding one of the straws closed such that gas is retained in the balloon envelope; and a cord connected to the movable plate such that the first end of the corresponding one of the straws is opened when the cord is cut; and a control system configured to:

cause at least one of the mechanisms to open the first end of at least one corresponding straw such that gas below the second end of the at least one corresponding straw is released from the balloon envelope through the at least one corresponding straw, causing the balloon to descend.

* * * * *